United States Patent [19]

Stedman et al.

[11] Patent Number: 5,675,364
[45] Date of Patent: Oct. 7, 1997

[54] DISPLAY WAKEUP CONTROL

[75] Inventors: Roy W. Stedman; Brian L. Kaisner, both of Austin, Tex.

[73] Assignee: Dell USA, L.P., Round Rock, Tex.

[21] Appl. No.: 432,437

[22] Filed: Apr. 28, 1995

[51] Int. Cl.$^6$ ............................................. G09G 5/00
[52] U.S. Cl. ................................. 345/211; 345/212
[58] Field of Search ............................. 345/211, 212; 395/750

[56] References Cited

U.S. PATENT DOCUMENTS 5,513,359  4/1996  Clark et al. ........................... 395/750

OTHER PUBLICATIONS

Video Electronics Standards Association, "Display Power Management Signaling (DPMS) Proposal", Aug. 20, 1993, pp. i–iv, 1–9.

Video Electronics Standards Association, "Display Data Channel Standard", Aug. 12, 1994, pp. 1–28.

Video Electronics Standards Association, "Vesa Bios Extensions/Display Data Channel, (VBE/DDC) Standard", Aug. 12, 1994, pp. i–iv, 1–6.

*Primary Examiner*—Kee M. Tung
*Assistant Examiner*—Matthew Luu
*Attorney, Agent, or Firm*—Skjerven, Morrill, MacPherson, Franklin & Friel, L.L.P.; Stephen A. Terrile

[57] ABSTRACT

A computer system with communication path from a display to a host system is disclosed. The display provides an on/off switch cycled indication when the display's on/off switch is cycled. The host system provides a wakeup signal to the display when the host system receives the on/off switch cycled indication to transition the display from a display power saving mode of operation to a full power mode of operation. Such a computer system advantageously provides an intuitive wakeup control function.

9 Claims, 4 Drawing Sheets

DISPLAY WAKEUP CONTROL

BACKGROUND OF THE INVENTION

The present invention relates to computer systems, and more particularly to display devices for use with computer systems such as personal computer systems.

Personal computer systems in general and IBM compatible personal computer systems in particular have attained widespread use for providing computer power to may segments of today's modern society. A personal computer system can usually be defined as a desk top, floor standing, or portable microcomputer that includes a system unit (also referred to as a host system) having a system processor and associated volatile and non-volatile memory, one or more diskette drives, and a fixed disk storage device; the computer system also includes a display, a keyboard, and a mouse coupled to the system unit. One of the distinguishing characteristics of these systems is the use of a system board to electrically connect these components together. These personal computer systems are information handling systems which are designed primarily to give independent computing power to a single user (or a relatively small group of users in the case of personal computers which serve as computer server systems) and are inexpensively priced for purchase by individuals or small businesses.

Computer systems often have different modes of operation such as a full power mode of operation and a power saving mode of operation. In the full power mode of operation all of the components of the computer system are fully operational. In the power saving mode of operation, power is only provided to certain portions of the computer system such as wakeup circuits while power is not provided to the remainder of the computer system. Generally, the computer system transitions from the power saving mode of operation to the full power mode of operation when certain events occur. The events include for example, when a key on the keyboard is actuated or when the mouse is moved. When one of these events occurs, a signal is sent to the wakeup portion of the computer which in turn causes the computer system to transition to the full power mode of operation.

One challenge with present computer systems is making the systems more intuitive to use. For example, when the computer is in the power saving mode of operation, the display of the computer system appears to the user to be off. Thus a user may cycle the display's on/off switch to turn the display on. However, when the computer is in the power saving mode of operation, this action has no visible result. As shown in FIG. 1A, labeled prior art, in known computer systems, there is no communication path from the display to the host system. Accordingly, the action of cycling the display had no effect on the host system.

Because of the lack of communication between the system unit and the display, a display data channel (DDC™) communication channel standard has been developed to enable a standard for communicating between the host computer and the display. A description of the DDC communication channel standard is available from the Video Electronics Standards Association (VESA) located in San Jose, Calif. The DDC communication channel standard provides basic configuration information of the display to the host computer. The DDC communication channel standard also provides a standard way of communicating advanced display functionality. FIG. 1B, labeled prior art, shows an example of system operation when the DDC standard is implemented.

There are a number of alternatives defined within the DDC communication channel standard. In a first alternative, referred to as DDC1, DDC data is continuously transmitted from the display to the host system. This DDC data is clocked by the vertical sync (VSYNC) signal which is provided to the display by the host system. In a second alternative, referred to as DDC2B or DDC2AB, data is only transmitted from the display to the host system when the host system requests the data. In this second alternative, the DDC data is clocked by a DDC clock signal which is provided by the host system via a signal path which for previous display system connections was unused and undefined.

FIGS. 1C–1G, labeled prior art, show the interaction between the host system and the display during normal and power saving modes of operation when the DDC communication standard is implemented on the computer system. More specifically, as shown in FIG. 1C, when the display is about to go into a power saving mode of operation due to a no use timeout, a display power monitor signaling (DPMS) off or standby signal is sent from the host system to the display. As shown in FIG. 1D, after the DPMS off or standby signal is received, the screen of the display goes off and no video data is sent from the host system to the display. As shown in FIG. 1E, labeled prior art, when a keyboard or mouse action signal triggers the host system to wake up, then a DPMS awake signal is transmitted to the display and the display prepares to come back on. However, as shown in FIG. 1F labeled prior art, when the on/off switch is cycled while the system is in the DPMS off state, no video data is transmitted to the display and no DDC data is transmitted to the host computer. Additionally, when the on/off switch is cycled to turn the display on, DDC data is again capable of being transmitted from the display; however, because the system is still in the power saving mode of operation, no video data is transmitted to the display.

SUMMARY OF THE INVENTION

It has been discovered that providing a computer system with a communication path from a display to a host system, providing a on/off switch cycled indication to the host system from the display and providing a wakeup signal from the host system to the display when the on/off switch cycled indication indicates that a display on/off switch is actuated advantageously provides a computer system with an intuitive wakeup control function.

In a preferred embodiment, the invention relates to a display for use with a computer system. The display has a display power saving mode of operation and a full power mode of operation. The display includes a screen, a wakeup circuit and an on/off switch. The screen provides visually detectable information. The wakeup circuit is coupled to the screen and to the computer system. The wakeup circuit controls whether the display is operating in the display power saving mode of operation or the full power mode of operation. The on/off switch controls whether power is provided to the display. The display provides an on/off switch cycled indication when the on/off switch is cycled. The computer system monitors the on/off switch cycled indication to determine whether the on/off switch is cycled and generates a wakeup signal when power to the display is cycled.

In a preferred embodiment, the on/off switch cycled indication includes a data signal which provides data from the display apparatus to the host system when the display apparatus is powered and does not provide data from the display apparatus to the host system when the display apparatus is not powered. Additionally, in a preferred embodiment communication between the display apparatus and the host system conforms to the display data channel communication channel standard, and the display apparatus provides a display data channel data signal to the host system. Additionally, in a preferred embodiment, the on/off switch cycled indication includes the display data channel data signal which provides data from the display apparatus to the host system when the display apparatus is powered and which does not provide data from the display apparatus to the host system when the display apparatus is not powered. Additionally, in a preferred embodiment, the on/off switch cycled indication includes a display data channel data signal which provides data from the display apparatus to the host system in response to a request from the host system, the display data channel data signal providing data from the display apparatus to the host system when requested by the host system if the display apparatus is powered and the display data channel data signal not providing data from the display apparatus to the host system when requested by the host system if the display apparatus is not powered.

DETAILED DESCRIPTION

The following sets forth a detailed description of the best contemplated mode for carrying out the invention. The description is intended to be illustrative of the invention and should not be taken to be limiting.

Figure 1A:
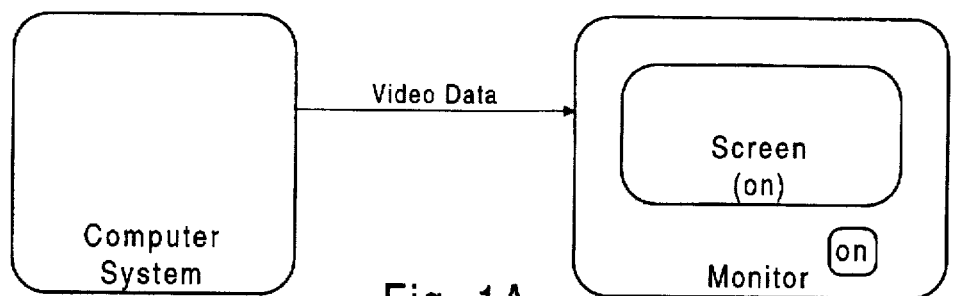
FIGS. 1A–1G, labeled prior art, show various operating modes of a computer system.
Figure 1B:
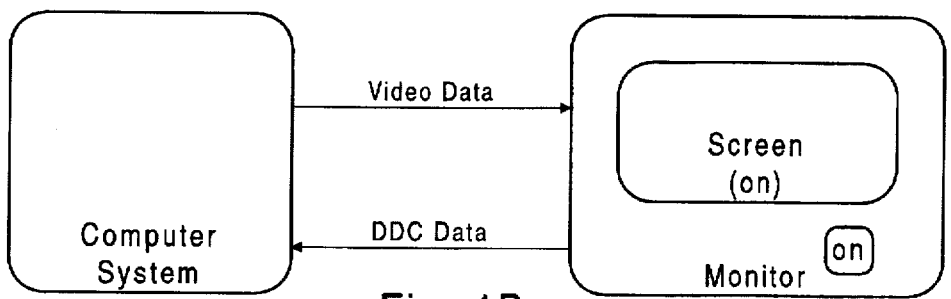
Figure 1C:
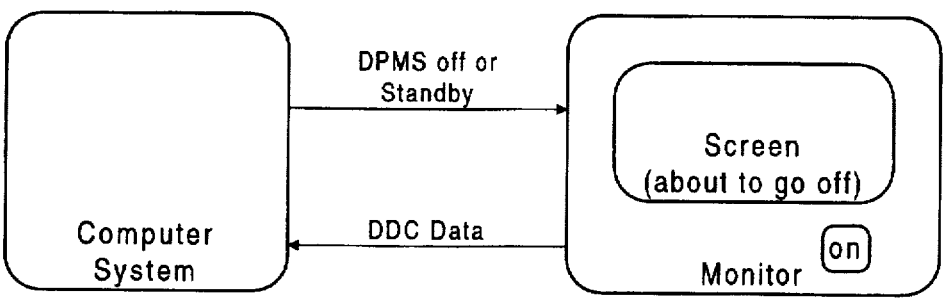
Figure 1D:
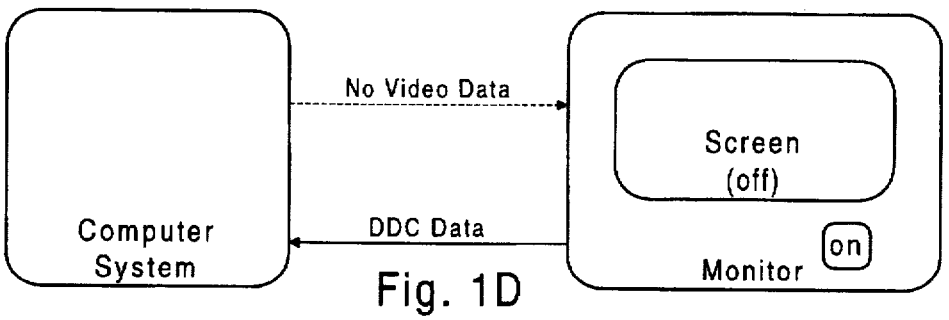
Figure 1E:
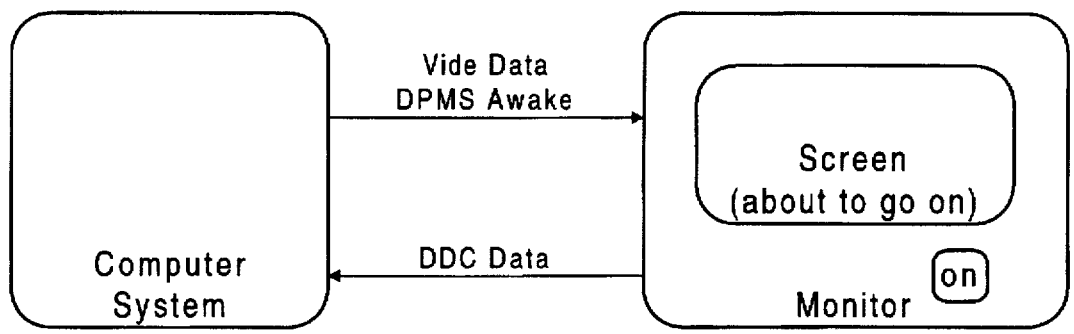
Figure 1F:
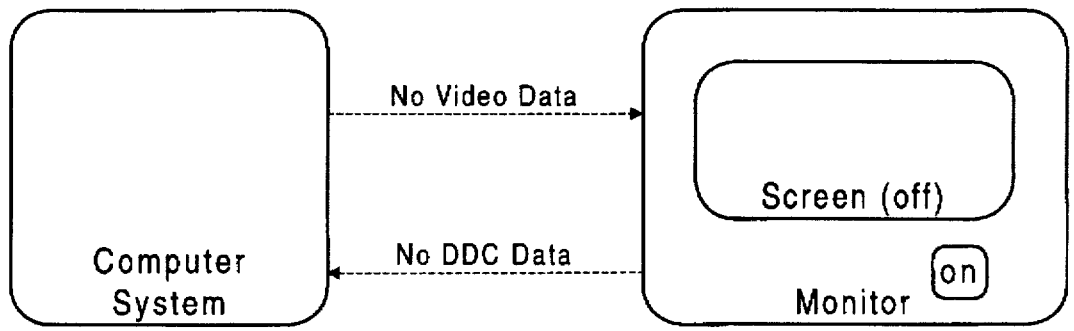
Figure 1G:
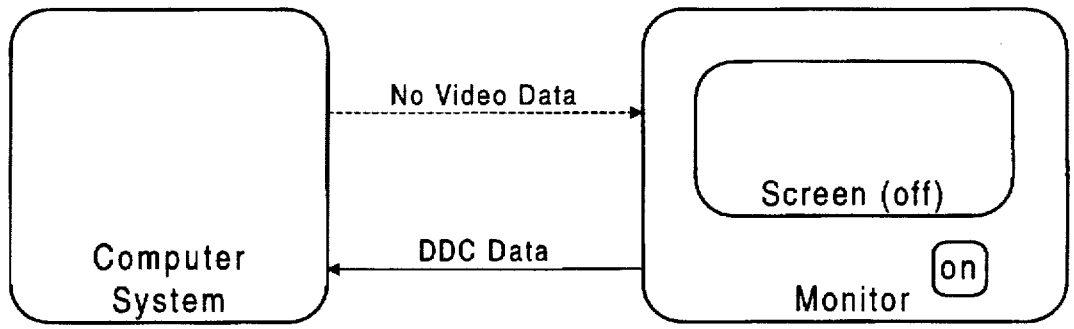
Figure 2:
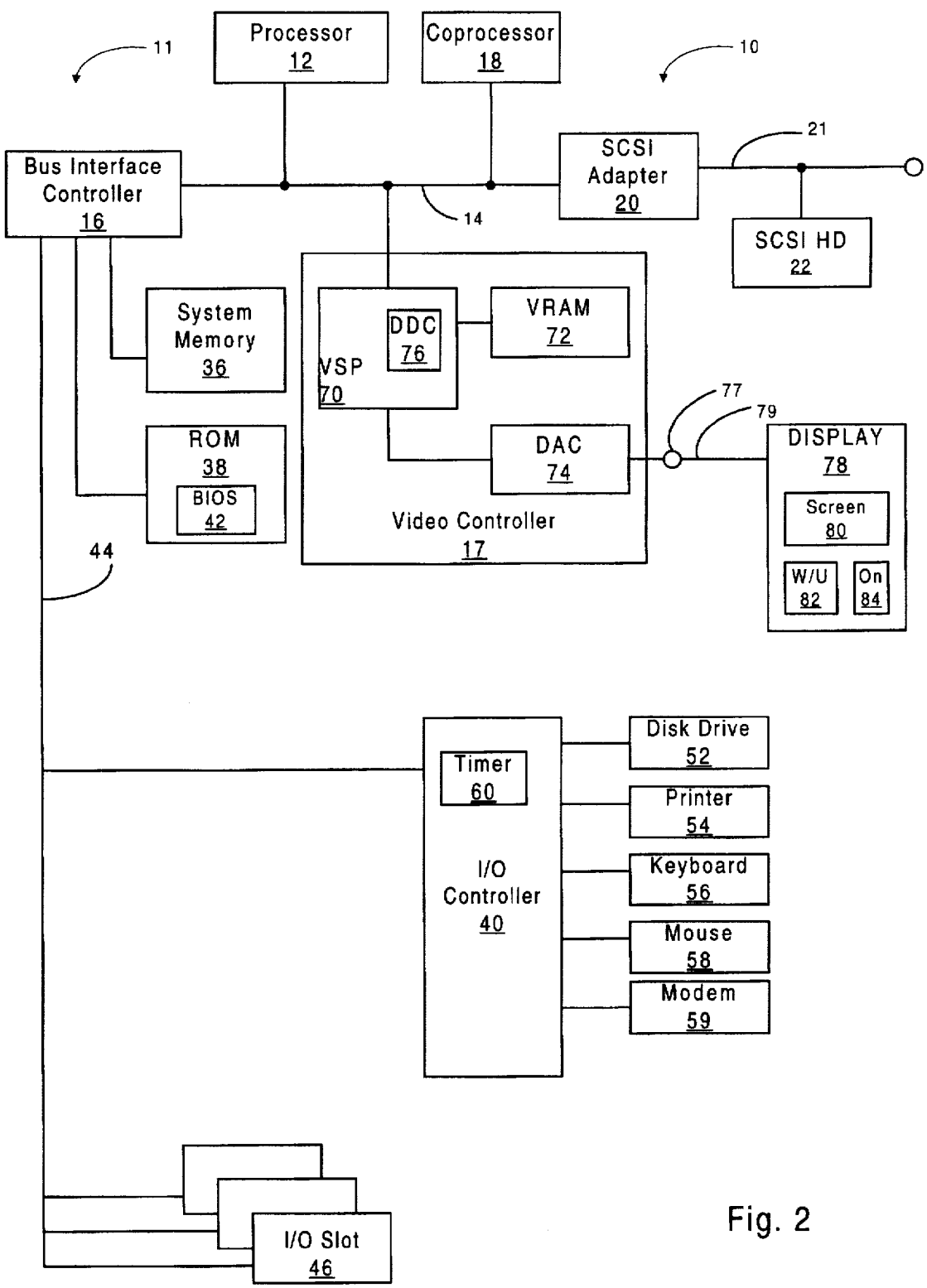
FIG. 2 shows a block diagram of a system which includes a multibus circuit in accordance with the present invention.

Referring to FIG. 2, personal computer system 10 is shown. Computer system 10 includes host system 11 having system processor 12, coupled to local bus 14 which, in turn, is coupled to bus interface controller 16, coprocessor 18, video controller 17 and small computer system interface (SCSI) adapter 20. Processor 12 is preferably a microprocessor from the family of x86 processors, such as a 486 microprocessor. Local bus 14 includes conventional data, address and control lines conforming to, for example, the peripheral connect interface (PCI) architecture. SCSI adapter 20 couples local bus 14 to SCSI bus 21 to which SCSI devices such as a SCSI hard drive 22 may be coupled. Host system 11 also includes system memory 36, nonvolatile memory 38 and I/O controller 40, which are all coupled to bus interface controller 16.

Bus interface controller 16 performs two primary functions. The first function that bus interface controller 16 performs is as a memory controller for accessing main system memory 36 and nonvolatile memory 38. Main system memory 36 is a dynamic random access memory (RAM) which includes one or more single, in-line memory modules (SIMMS) and stores programs and data for execution by system processor 12 and coprocessor 18. Nonvolatile memory 38 is, e.g., a read only memory (ROM) which stores microcode including the basic input output system (BIOS) 42 of computer system 10.

BIOS 42 is a microcode software interface between an operating system or application programs and the hardware of system 10. The operating system and application programs access BIOS 42 rather than directly manipulating I/O ports and control words of the specific hardware. BIOS 42 is accessed through an interface of software interrupts and contains a plurality of entry points corresponding to the different interrupts. In operation, BIOS 42 is loaded from ROM 38 to system memory 36 and is executed from system memory 36.

The second function that bus interface controller 16 performs is as an interface between bus 14 and input/output (I/O) bus 44. I/O bus 44 conforms to the industry standard architecture (ISA) standard, which is also sometimes referred to as the AT bus standard. Bus 44 is further coupled to I/O controller 40, and a plurality of I/O slots 46, into which a variety of I/O or expansion cards (not shown) may be inserted.

I/O controller 40 is also coupled to and controls the operation of disk drive 52, printer 54, keyboard 56 and mouse 58. I/O controller 40 also includes a modem port to which a modem 59 may be optionally connected. I/O controller 40 includes internal power saving timer 60 which is used in determining whether computer system 10 should operate in a full power mode of operation or in a system power saving mode of operation.

More specifically, power saving timer 60 is a counter which is reset by activity in either keyboard 56 or mouse 58. When the counter is reset it restarts a power save count which is counted down from a predetermined count. When the power save count equals zero, power saving timer 60 generates an interrupt which is sent to system processor 12. System processor 12 receives this interrupt and interprets the interrupt to indicate that computer system 10 should enter the system power saving mode of operation. Accordingly, system processor 12 causes portions of computer system 10 to be shut down, with the last portion that is shut down being the system processor itself.

After entering the system power saving mode of operation, computer system 10 remains in the system power saving mode of operation until a wakeup signal is generated by I/O controller 40. More specifically, when I/O controller 40 receives an indication of action from either keyboard 76 or mouse 78, I/O controller 40 then generates the wakeup signal which signals system processor 12 to wake up, i.e., to transition from the system power saving mode of operation to the normal mode of operation. After processor 12 wakes up, it then causes the other portions of computer system 10 to wake up.

Video controller 17, which is coupled to local bus 14, includes video signal processor (VSP) 70, video RAM (VRAM) 72 and digital to analog converter (DAC) 74. Video signal processor 70 includes DDC port 76. Video signal processor 48 is coupled to video RAM (VRAM) 60 and to digital to analog converter (DAC) 74. Digital to analog converter 74 is coupled to display connector 77. Display 78, which is a computer display device conforming to, e.g., the super video graphics array (SVGA) standard, is coupled to display connector 77 via display cable 79. Display 78 includes screen 80 on which video information is presented, wakeup circuit (labeled "w/u") 82 as well as on/off switch 84 (labeled "on"). Display cable 79 includes a line for transmitting serial DDC data; display connector 77 includes a terminal for coupling the line for transmitting DDC data to DDC port 76. The DDC data provided by display 78 is received and held in DDC port 76.

BIOS 42 includes video BIOS which is executed by system processor 12. At power on or reset, system processor 12 executes the video BIOS to obtain configuration information from display 78 and uses this information to configure VSP 70 to operate with the particular display. Additionally, system processor 12 is executing a wakeup module which monitors the DDC data to determine when display 78 should be returned to a full power mode of operation.

Display 78 provides information back to processor 12 when on/off switch 84 is actuated. This information may be used by processor 12 to wake up display 78 from a display power saving mode of operation. More specifically, when the on/off switch 84 is cycled, an on/off cycle indication is provided to computer system 10. When the host system receives this on/off cycle indication, the host system causes display 78 to wake up.

Figure 3:
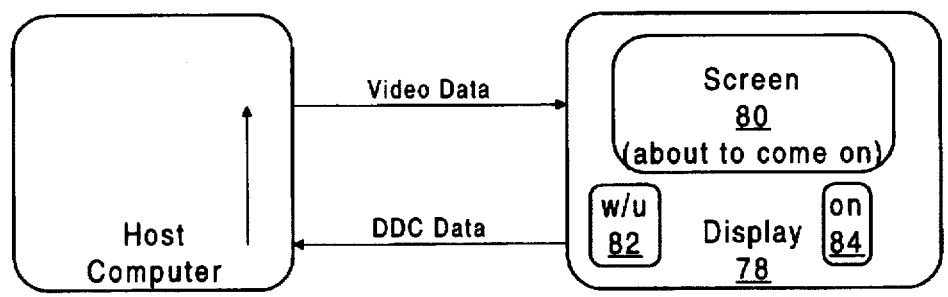
FIG. 3 shows a display wake up mode of operation in accordance with the present invention.

More specifically, referring to FIG. 3, when a user cycles on/off switch 84 of display 78, an on/off switch cycled indication is sent from display 78 to host system 11. When this on/off switch cycled indication is received, host system 11 interprets this indication to trigger wakeup circuit 82 by sending a DPMS awake signal to display 78. Wakeup circuit 82 then returns display 78 to the full power mode of operation and host system 11 restarts sending video data to display 78.

Figure 4:
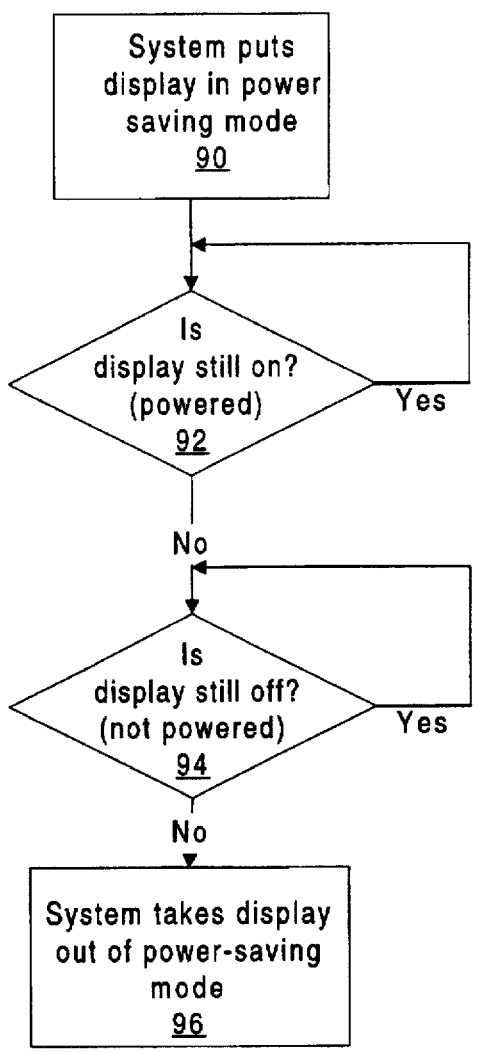
FIG. 4 shows a flow chart of a wake up control sequence in accordance with the present invention.

This operation is shown in more detail in the flow chart set forth in FIG. 4. This flow chart is a representation of a video wakeup module which is included, for example, within a display device driver. When executed by computer system 10, the wakeup module provides the display wakeup function. More specifically, when certain predetermined conditions are met, e.g., when the information which is being displayed by display 78 has not changed for a predetermined amount of time, then host system puts display 78 into a display power saving mode of operation at power saving mode step 90. The predetermined conditions may be set by BIOS or by an application program such as, e.g., a screen saver program. During the display power saving mode of operation, display 78 is powered down. However, wakeup circuit 82 remains powered and operative.

While in this power saving mode of operation, the host system monitors, at monitor step 92, whether display 78 is still on, i.e., whether power is being provided to display 78. Host system monitors the DDC port of VSP 70 which provides the indication of whether display 78 is on based upon on/off switch 84 being in the on position. While power is still on, host system 11 loops within the power saving mode of operation. If power is not on, then host system 11 transitions to a second monitor step 94 during which display 78 is monitored to determine whether display 78 is still off, i.e., whether power is not being provided to display 78. Host system 11 monitors DDC port 76 of VSP 70 which provides the indication of whether display 78 is off based upon on/off switch 84 being in the off position. While power is still off, host system 11 continues to loop within the power saving mode. However, when host system 11 determines that power has been returned to display 78, which indicates that the on/off switch has been cycled, then host system 11 transitions to wake up step 96 during which time host system 11 takes display 78 out of the power saving mode of operation.

In the preferred embodiment, host system 11 observes the DDC1 data stream that is being transmitted by display 78. If the DDC1 data stream ceases being transmitted, host system 11 determines that display 78 has been turned off. If the DDC1 data stream then reappears, then host system 11 determines that display 78 has been turned back on, thus indicating to host system 11 that the on/off switch has been cycled, and causing host system 11 to wake up display 78.

OTHER EMBODIMENTS

Other embodiments are within the following claims.

For example, computer system 10 may be configured to operate in a DDC2B or DDC2AB mode of operation, in which display 78 only transmits data on request. In this mode of operation, host system 11 is configured to repeatedly request for display 78 to transmit a data stream. If display 78 does not respond to the request or if display 78 only transmits a partial data stream, then host system 11 interprets this condition as indicating that display 78 has been turned off. If a later query succeeds in obtaining a response from display 78, then host system 11 interprets this response as indicating that power has been restored to display 78, and thus that on/off switch 84 has been cycled. Accordingly, host system 11 wakes up display 78.

Also for example, other modes of operation which use the DDC standard may also be implemented. More specifically, whenever display 78 is powered on, display 78 sets a bit in the DDC data stream for a predetermined amount of time (e.g., several seconds). Computer system 10 monitors this bit when the video image is blanked. If the bit is active, the system recognizes that the display has been turned on and, therefore, the display power switch must have been cycled. Accordingly, computer system 10 knows that the video image should be restored. If the bit remains inactive, indicating that the display has not been cycled. Computer system 10 knows that the video image should remain blanked, i.e., in a power saving mode.

Also for example, while the preferred embodiments are disclosed with reference to the DDC standard, it is contemplated that the invention could be implemented in systems that do not implement the DDC standard. More specifically, a standard display connector on a personal computer system includes a plurality of spare display identification pins that are not typically used by the system or the display. By connecting a circuit to a display identification line in the display, the state of the display may be determined. If the display is powered, the line is driven to a first predetermined logic state and if the display is not powered, the line is driven to a second predetermined logic state. Therefore, if the system has blanked the display image, the system may monitor the display identification line transmission state to determine whether the display power was cycled. One indication of this is a changing state for the display identification line. By determining whether the display power was cycled, the system may thus determine whether the video image should be restored.

What is claimed is:

1. A display apparatus for use with a computer system, the display apparatus having a display power saving mode of operation and a full power mode of operation, communication between the display apparatus and a host system conforming to the display data channel communication channel standard, the display apparatus providing a display data channel data signal to the host system, the display apparatus comprising:

a screen, the screen providing visually detectable information;

a wakeup circuit coupled to the screen and to the host system, the wakeup circuit controlling whether the display apparatus is operating in the display power saving mode of operation or the full power mode of operation; and an on/off switch, the on/off switch controlling whether power is provided to the display apparatus, the display apparatus providing an on/off switch cycled indication when the on/off switch is cycled, the host system monitoring the on/off switch cycled indication to determine whether the on/off switch is cycled and generating a wakeup signal when power to the display is cycled;

wherein the on/off switch cycled indication includes the display data channel data signal, the display data channel data signal being provided from the display apparatus to the host system in response to a request from the host system, the display data channel data signal providing data from the display apparatus to the host system when requested by the host system if the display apparatus is powered and the display data channel data signal not providing data from the display apparatus to the host system when requested by the host system if the display apparatus is not powered.

2. The display apparatus of claim 1 wherein the on/off switch cycled indication includes a data signal, the data signal providing data from the display apparatus to the host system when the display apparatus is powered and the data signal not providing data from the display apparatus to the host system when the display apparatus is not powered.

3. A computer system comprising a host system including a processor, a memory coupled to the processor, and a video signal processor coupled to the processor and the memory, the video signal processor including a data port, the display data port holding information relating to whether a display on/off switch is cycled; and a display coupled to the video signal processor of the host system, the display having a display power saving mode of operation and a full power mode of operation, the display including a screen, the screen providing visually detectable information, a wakeup circuit coupled to the screen and to the host system, the wakeup circuit controlling whether the display is operating in the display power saving mode of operation or the full power mode of operation, and an on/off switch, the on/off switch controlling whether power is provided to the display, the display providing an on/off switch cycled indication when the on/off switch is cycled to the display data port, the host system monitoring the on/off switch cycled indication to determine whether the on/off switch is cycled and providing a wakeup signal to the display when power to the display is cycled.

4. The display apparatus of claim 3 wherein the on/off switch cycled indication includes a data signal, the data signal providing data from the display apparatus to the host system when the display apparatus is powered and the data signal not providing data from the display apparatus to the host system when the display apparatus is not powered.

5. The display apparatus of claim 3 wherein communication between the display apparatus and the host system conforms to the display data channel communication channel standard, and the display apparatus provides a display data channel data signal to the host system.

6. The display apparatus of claim 5 wherein the on/off switch cycled indication includes the display data channel data signal, the display data channel data signal providing data from the display apparatus to the host system when the display apparatus is powered and the display data channel data signal not providing data from the display apparatus to the host system when the display apparatus is not powered.

7. The display apparatus of claim 5 wherein the on/off switch cycled indication includes the display data channel data signal, the display data channel data signal being provided from the display apparatus to the host system in response to a request from the host system, the display data channel data signal providing data from the display apparatus to the host system when requested by the host system if the display apparatus is powered and the display data channel data signal not providing data from the display apparatus to the host system when requested by the host system if the display apparatus is not powered.

8. A method of operating a computer system having a host computer and a display, the display including an on/off switch, the method controlling transition between a display power saving mode of operation and a full power mode of operation, communication between the display and the host computer conforming to the display data channel communication channel standard, the method comprising:

providing the host computer with an on/off switch cycled indication when the on/off switch is cycled;

monitoring the on/off switch cycled indication to determine whether the on/off switch of the display is cycled;

sending a wakeup signal to the display when the on/off switch cycled indication indicates that the on/off switch of the display is cycled; and transitioning the display from the display power saving mode of operation to the full power mode of operation upon receiving the wakeup signal;

providing a display data channel data signal to the host computer from the display, the on/off switch cycled indication including the display data channel data signal; and, providing the display data channel data signal from the display to the host computer in response to a request from the host computer, the display data channel data signal providing data from the display to the host computer when requested by the host computer if the display is powered and not providing the display data channel data signal from the display to the host computer when requested by the host computer if the display is not powered.

9. The method of claim 8 wherein the on/off switch cycled indication includes a data signal, and further comprising providing data from the display to the host computer when the display is powered and not providing data from the display to the host computer when the display is not powered.

* * * * *